(12) United States Patent
Sahoo et al.

(10) Patent No.: US 11,894,908 B2
(45) Date of Patent: Feb. 6, 2024

(54) METHOD AND SYSTEM FOR MANAGING BEAM ALIGNMENT IN A HIGH FREQUENCY COMMUNICATION SYSTEM

(71) Applicant: Samsung Electronics Co., Ltd., Suwon-si (KR)

(72) Inventors: Ashok Kumar Sahoo, Bangalore (IN); Anusha Gunturu, Bangalore (IN); Ankur Goyal, Bangalore (IN); Ashok Kumar Reddy Chavva, Bangalore (IN); Divpreet Singh, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 135 days.

(21) Appl. No.: 17/825,629

(22) Filed: May 26, 2022

(65) Prior Publication Data

US 2022/0385350 A1 Dec. 1, 2022

Related U.S. Application Data

(63) Continuation of application No. PCT/KR2022/007314, filed on May 23, 2022.

(30) Foreign Application Priority Data

May 29, 2021 (IN) .............................. 202141023980
May 13, 2022 (IN) .............................. 2021 41023980

(51) Int. Cl.
*H04B 7/08* (2006.01)
*H04W 64/00* (2009.01)
*H04W 72/23* (2023.01)

(52) U.S. Cl.
CPC ............. *H04B 7/086* (2013.01); *H04B 7/088* (2013.01); *H04B 7/0857* (2013.01); *H04W 64/006* (2013.01); *H04W 72/23* (2023.01)

(58) Field of Classification Search
CPC ........ H04B 7/06; H04B 7/086; H04B 7/0857; H04B 7/08; H04B 7/088; H04B 7/0695; H04W 64/006; H04W 72/23
See application file for complete search history.

(56) References Cited

U.S. PATENT DOCUMENTS 10,992,364 B2* 4/2021 Tang .................... H04B 7/0617
11,582,756 B2* 2/2023 Liu ........................ H04W 4/027
(Continued)

FOREIGN PATENT DOCUMENTS

CN 108023707 A 5/2018
CN 110475326 A 11/2019
(Continued)

OTHER PUBLICATIONS

Han et al., "Hybrid Beamforming for Terahertz Wireless Communications: Challenges, Architectures, and Open Problems," Jan. 21, 2021.
(Continued)

*Primary Examiner* — Sophia Vlahos
(74) *Attorney, Agent, or Firm* — Jefferson IP Law, LLP

(57) ABSTRACT

A method for managing beam alignment by a user equipment is provided. The method comprises receiving beam width information and base station location information from a base station, calculating a displacement of location of the UE based on location coordinates of the UE, measuring a change in a signal strength of the UE due to the displacement, and determining whether the UE is moving towards or away from the base station using at least one of the beam width information, base station location information, the displacement, and the measured change in the signal strength, determining whether a beam re-alignment is required based on the determination of the movement of UE, and transmitting a realignment request to the base station for (Continued)

a re-aligned beam width and a new transmission beam based on determining that the beam re-alignment is required.

20 Claims, 10 Drawing Sheets

(56) References Cited

U.S. PATENT DOCUMENTS

| | | |
|---|---|---|
| 2017/0155439 A1* | 6/2017 | Chang .................... H01Q 3/26 |
| 2019/0260455 A1 | 8/2019 | Ryu et al. |
| 2019/0261296 A1 | 8/2019 | Li et al. |
| 2020/0107288 A1 | 4/2020 | Kumar et al. |
| 2020/0235800 A1 | 7/2020 | Tang et al. |
| 2021/0036760 A1 | 2/2021 | Kim et al. |
| 2021/0160704 A1 | 5/2021 | Aksu et al. |

FOREIGN PATENT DOCUMENTS

| | | |
|---|---|---|
| KR | 10-2017-0072161 A | 6/2017 |
| KR | 10-2018-0099021 A | 9/2018 |
| WO | 2018/082575 A1 | 8/2019 |
| WO | 2020/166981 A1 | 8/2020 |
| WO | 2021/053650 A1 | 3/2021 |

OTHER PUBLICATIONS

Indian Office Action dated Dec. 30, 2022, issued in Indian Application No. 202141023980.

International Search Report and written opinion dated Aug. 26, 2022, issued in International Application No. PCT/KR2022/007314.

* cited by examiner

METHOD AND SYSTEM FOR MANAGING BEAM ALIGNMENT IN A HIGH FREQUENCY COMMUNICATION SYSTEM

CROSS-REFERENCE TO RELATED APPLICATION(S)

This application is a continuation application, claiming priority under § 365(c), of an International application No. PCT/KR2022/007314, filed on May 23, 2022, which is based on and claims the benefit of an Indian Provisional patent application number 202141023980, filed on May 29, 2021, in the Indian Patent Office, and of an Indian Complete patent application number 202141023980, filed on May 13, 2022, in the Indian Patent Office, the disclosure of each of which is incorporated by reference herein in its entirety.

FIELD OF THE INVENTION

The disclosure relates to the field of wireless communication. More particularly, the disclosure relates to a method and system for managing beam alignment in a high frequency wireless communication system.

BACKGROUND

Terahertz (THz) communication systems are an emerging technology in beyond $5^{th}$ generation (5G) networks and $6^{th}$ generation (6G) networks. THz communications systems utilize operation frequencies above 100 gigahertz (GHz) to achieve improved channel capacity usage. The Terahertz (THz) band (300 GHz-10 THz) is a promising area of additional bandwidth, possibly helping to push data rates up to 1 TeraBits Per Second (Tbps), thus proving tremendous data rate.

The existing cellular technologies such as millimeter wave (mmWave) systems cannot support such data rate due to limited bandwidth. A THz communication system including a User Equipment (UE) 104 and a Base Station (BS) 102 such as gNB is shown in FIG. 1.

FIG. 1 is a diagram illustrating an example of a THz cellular communication with a fall-back connection, according to an embodiment of the disclosure.

Referring to FIG. 1, the UE 104 is communicating with the BS 102 using a THz connection and with a fall-back network 106 using a fall-back connection. The THz communication system uses frequencies in the range of 0.1 THz to 10 THz which has several tens of GHz consecutive available bandwidth to support data rates in the order of Tbps. However, the overall path loss at this frequency is very high due to the Spreading loss, which is directly proportional to the square of wavelength, and Molecular absorption loss.

To mitigate these losses, the narrow beams with high antenna gains are used at the transmitter and receiver for THz communication. However, the alignment of transmitter and receiver beams is crucial for successful communication, which becomes a challenge in the THz communication due to narrow beams. Along with this, optimal beam width (directivity angle) must be chosen in the THz system to maximize the throughput. As narrow beams are used in THz, frequent Transmit-Receive (Tx-Rx) beam misalignments will occur which may lead to link failure.

FIG. 2 is a diagram illustrating a UE Rx Beam misalignment in the THz cellular communication due to a change in an orientation of the UE, according to the related art.

Referring to FIG. 2, an example scenario depicting a problem in the THz communication due to a change of orientation of the UE 104 due to the rotation. The orientation of the UE 104 changes due to the rotation (the most common use case is the gaming where the UE stays at a fixed location but keeps on rotating). For this scenario, the UE 104 can still remain in connection with the BS 102 i.e., gNB by changing the Rx beam from #1 to #2 as depicted in the example. As the Direction of Arrival (DoA) of the signal at the UE 104 from the BS 102 remains the same, there is no need to change the gNB's Tx beam. Hence, the THz connection is highly susceptible to link failures due to Tx-Rx beam direction misalignment and large path loss. Hence, a method should be defined for identifying the link failure ahead of time in a standalone mode of operation.

FIG. 3 is a diagram illustrating a UE Rx Beam misalignment in the THz cellular communication due to a displacement of the UE with respect to the BS, according to the related art.

Referring to FIG. 3, further, a scenario depicting a problem in the THz communication due to displacement of the UE 104 is illustrated. When there is a relative motion between Tx and Rx nodes, the chances of beam misalignments become high, which leads to THz link failure. FIG. 3 depicts a beam misalignment between the BS 102 (Tx) and the UE 104 (Rx) due to the movement of the UE 104 with respect to the BS 102. When the UE 104 is displaced from its initial position with respect to the BS 102, then the direction of Departure (DoD) of the signal from the BS 102 to the UE 104 changes. Hence, there is a need to change both the Tx beam of the BS 102 and the Rx beam of the UE 104 for the beam alignment. In the THz communication, due to the user displacement, the beam re-alignment of both the Tx and Rx beams can be a frequent procedure because of the use of the narrower beams in the THz communication, thus an efficient way of alignment procedure needs to be defined for faster re-alignment of the Tx and Rx beams.

Therefore, there lies a need for a method and system to mitigate the above problems of the beam misalignment in THz communication due to the change in the orientation and the mobility of the UEs.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide to introduce a selection of concepts in a simplified format that is further described in the detailed description of the disclosure. This summary is not intended to identify key or essential inventive concepts of the disclosure, nor is it intended for determining the scope of the disclosure.

Additional aspects will be set forth in part in the description which follows and, in part, will be apparent from the description, or may be learned by practice of the presented embodiments.

In accordance with an aspect of the disclosure, a method for managing beam alignment in a wireless communication system by a User Equipment (UE) is provided. The method includes receiving beam width information and base station location information from a base station, calculating a displacement of location of the UE from a first location to a second location of the UE based on location coordinates of the UE, measuring a change in a signal strength of the UE after the displacement of the location of the UE with respect to a signal strength of the UE at the first location, determining whether movement of the UE is towards or away from the base station using at least one of the beam width information, the base station location information, the displacement of location of the UE, and the measured change in the signal strength of the UE, determining whether a beam re-alignment is required based on determining whether the movement of the UE is towards or away from the base station, transmitting a beam realignment request including location coordinates of the second location of the UE to the base station based on determining that the beam re-alignment is required, and receiving a re-aligned beam width and a new transmission beam from the base station in response to the transmitted beam realignment request.

The method further determining a requirement for a beam re-alignment based on the determination of the UE movement towards or away from the base station. Subsequent to the determination of the requirement for the beam re-alignment, the method further includes transmitting, by the UE, a beam realignment request including location coordinates of the second location of the UE to the base station based on the determination of the requirement for the beam re-alignment, and thereafter receiving, by the UE, a re-aligned beam width and a new transmission beam from the base station in response to the transmitted beam realignment request.

In accordance with another aspect of the disclosure, a method for managing beam alignment in a wireless communication system by a base station is provided. The method includes receiving, from a User Equipment (UE), location coordinates of a first location of the UE, receiving a beam realignment request including location coordinates of a second location of the UE, calculating a plurality of beam related parameters based on location coordinates of the base station and the location coordinates of the second location of the UE included in the received beam realignment request, estimating an optimal transmission beam width based on the calculated plurality of beam related parameters, generating a new transmission beam with the optimal transmission beam width, and transmitting the generated new transmission beam with the optimal transmission beam width to the UE in response to the received beam realignment request.

The disclosure relates to a User Equipment (UE) for managing beam alignment in a wireless communication system. The UE includes a transceiver and at least one processor coupled to the transceiver. The at least one processor is configured to receive beam width information and base station location information from a base station, calculate a displacement of location of the UE from a first location to a second location of the UE based on location coordinates of the UE, measure a change in a signal strength of the UE after the displacement of the location of the UE with respect to a signal strength of the UE at the first location, determine whether movement of the UE is towards or away from the base station using at least one of the beam width information, the base station location information, the displacement of location of the UE, and the measured change in the signal strength of the UE, determine whether a beam re-alignment is required based on determining whether the movement of the UE is towards or away from the base station, transmit a beam realignment request including location coordinates of the second location of the UE to the base station based on determining that the beam re-alignment is required, and receive a re-aligned beam width and a new transmission beam from the base station in response to the transmitted beam realignment request.

The disclosure relates to a base station for managing beam alignment in a wireless communication system. The base station that includes a transceiver and at least one processor coupled to the transceiver. The at least one processor is configured to receive location coordinates of a first location of the UE, receiving a beam realignment request including location coordinates of a second location of the UE, calculate a plurality of beam related parameters based on location coordinates of the base station and the location coordinates of the second location of the UE included in the received beam realignment request, estimate an optimal transmission beam width based on the calculated plurality of beam related parameters, generate a new transmission beam with the optimal transmission beam width, and transmit the generated new transmission beam with the optimal transmission beam width to the UE in response to the received beam realignment request.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
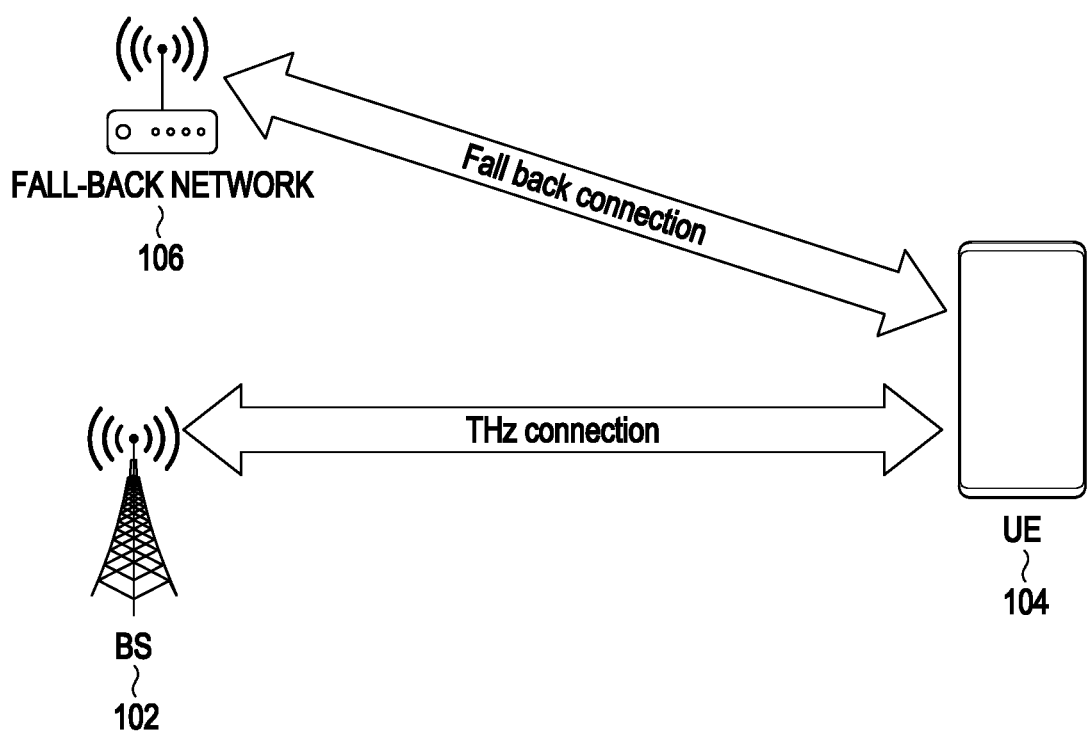
FIG. 1 is a diagram illustrating an example of a THz cellular communication with a fall-back connection, according to an embodiment of the disclosure.
Figure 2:
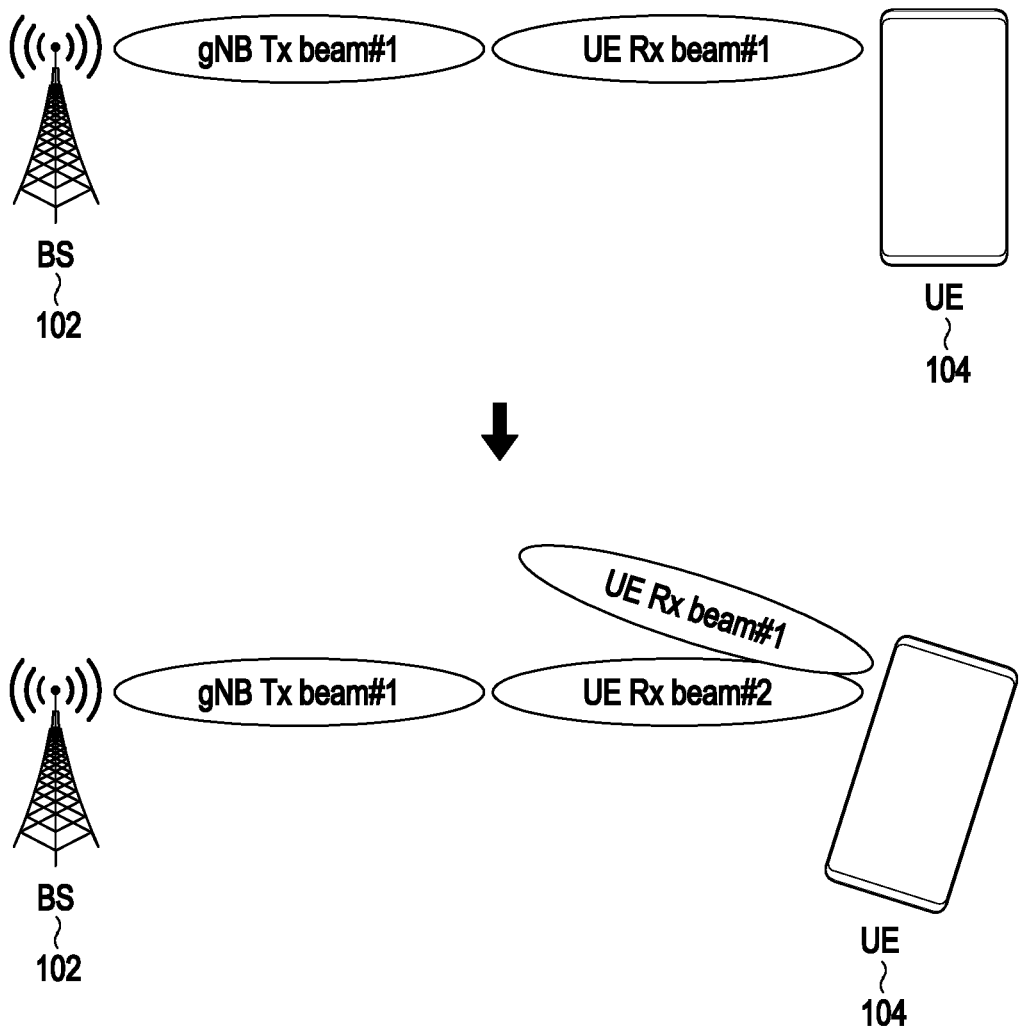
FIG. 2 is a diagram illustrating a UE Rx Beam misalignment in the THz cellular communication due to a change in an orientation of the UE, according to the related art.
Figure 3:
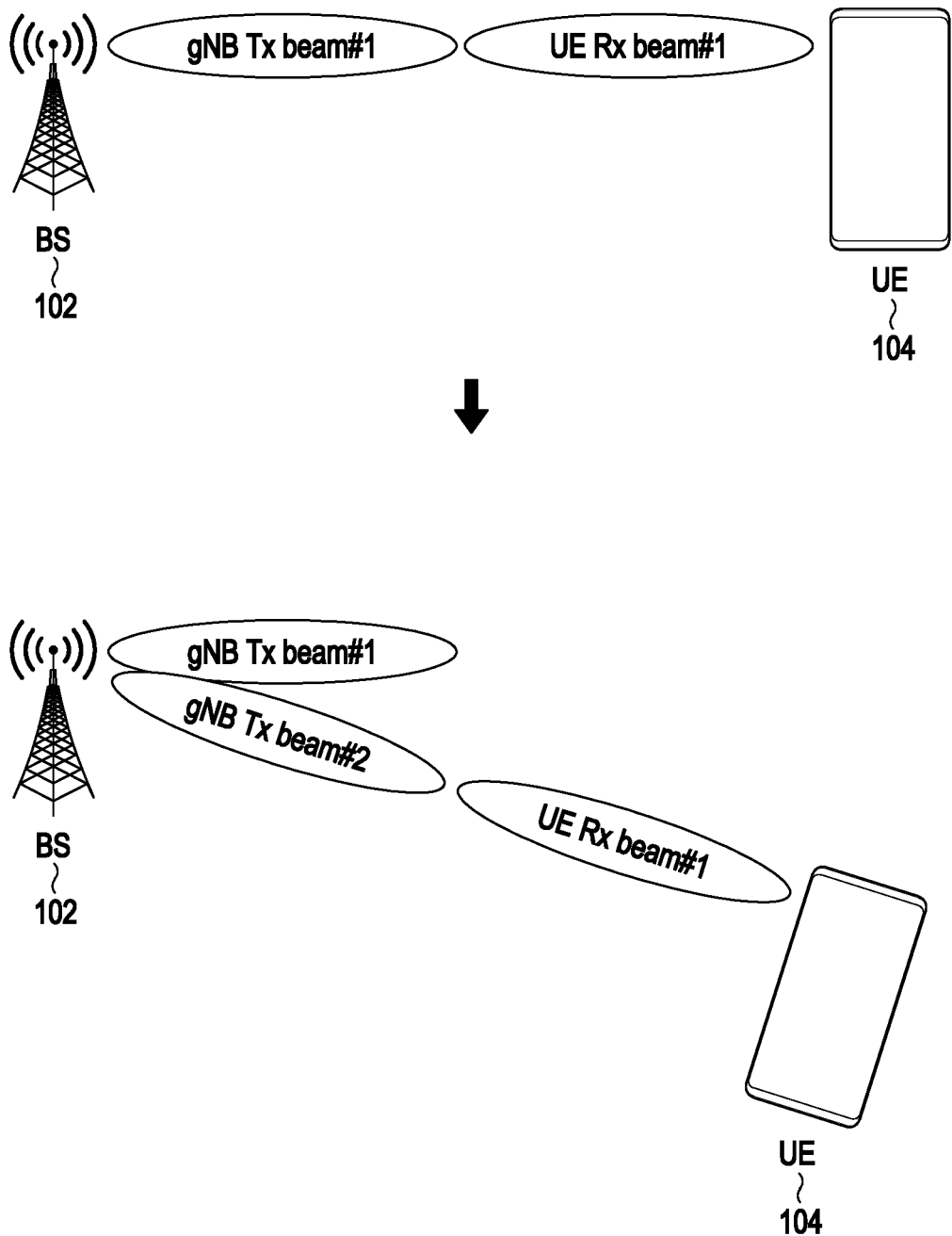
FIG. 3 is a diagram illustrating a UE Rx Beam misalignment in the THz cellular communication due to a displacement of the UE with respect to the BS, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Embodiments of the disclosure will be described below in detail with reference to the accompanying drawings.

Figure 4:
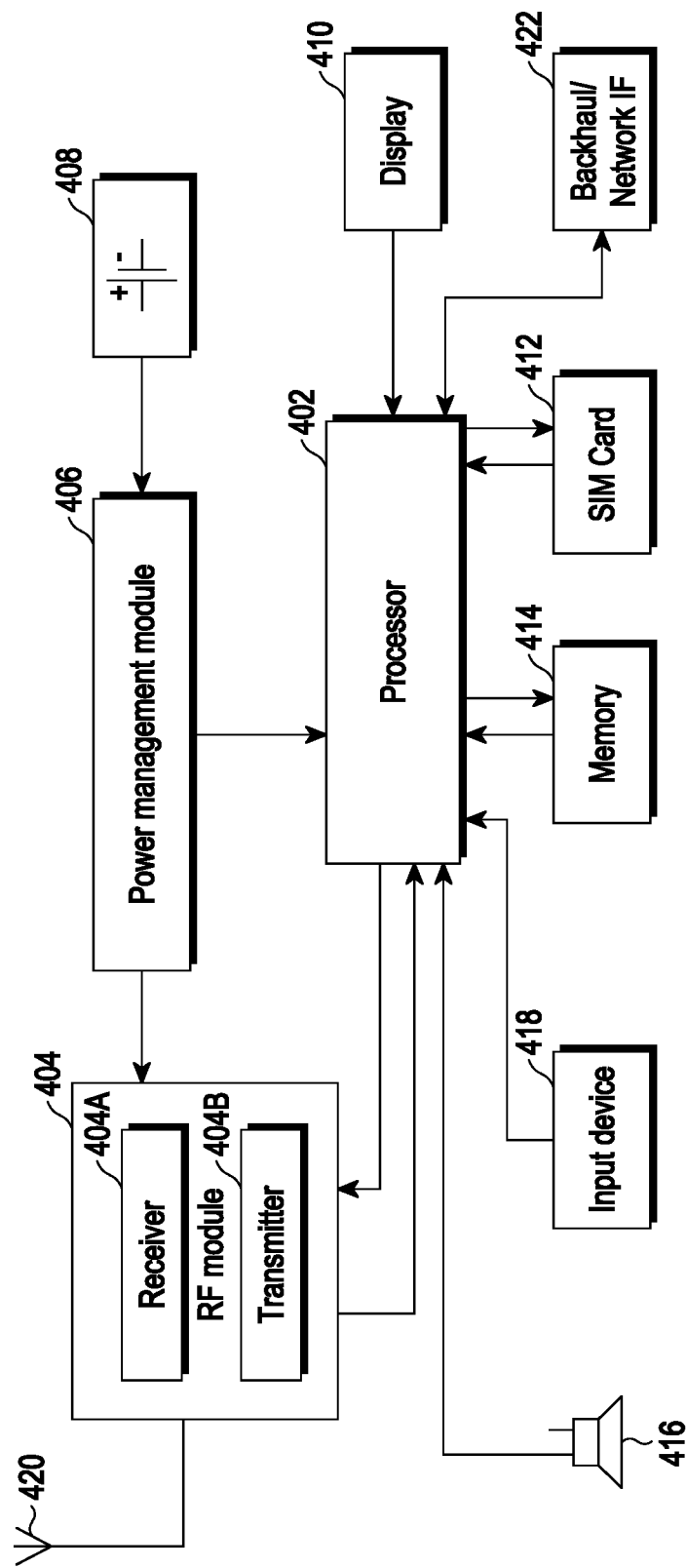
FIG. 4 is a block diagram of a wireless communication system including a transmitter and a receiver, according to an embodiment of the disclosure.

FIG. 4 is a block diagram of a wireless communication system including a transmitter and a receiver, according to an embodiment of the disclosure. The wireless communication system as shown in FIG. 4 may correspond to the BS 102 and/or UE 104 adapted to perform a THz communication to exchange data between them. The wireless communication system as shown in FIG. 4 is configured to perform the method operations illustrated in FIGS. 5, 7, 8, and 9, but it can be any system for performing the operations described below in flow charts of FIGS. 7, 8, and 9.

Referring to FIG. 4, the wireless communication system may include a processor 402 and an RF module (transceiver 404). The processor 402 is electrically connected with the transceiver 404 and controls the transceiver 404. The communication system may further include an antenna 420 connected to the RF module (transceiver 404), a power management module 406, a battery 408, a display 410, a SIM card 412, a memory device 414, a speaker 416, an input device 418, and a Backhaul/Network IF 422 based on an example implementation.

Specifically, the wireless communication system of FIG. 4 as the UE 104 comprises a receiver 404A configured to receive a message from a network or the BS 102, and a transmitter 404B configured to transmit the transmission or reception timing information to the BS 102 or the network. The receiver 404A and the transmitter 404B constitute the transceiver 404. The wireless communication system of FIG. 4 as the UE 104 comprises the processor 402, where the processor 402 is connected to the transceiver (404: receiver 404A and transmitter 404B).

Also, the wireless communication system of FIG. 4 may correspond to the BS 102 comprising a transmitter 404B configured to transmit a message to the UE 104 and a receiver 404A configured to receive the transmission or reception timing information from the UE 104. The receiver 404A and the transmitter 404B constitute the transceiver 404, where the processor 402 is connected to the transceiver (404: receiver 404A and transmitter 404B).

Depending on the network type, the term "base station" or "BS" can refer to any component (or collection of components) configured to provide wireless access to a network, such as an enhanced base station (eNodeB or gNB), a 5G base station (gNB), a wireless fidelity (Wi-Fi) access point (AP), or other wirelessly enabled devices. Base stations may provide wireless access in accordance with one or more wireless communication protocols, e.g., 5G 3rd generation partnership project (3GPP) new radio interface/access (NR), long-term evolution (LTE), LTE Advanced (LTE-A), high-speed packet access (HSPA), Wi-Fi 802.11a/b/g/n/ac, etc. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in the disclosure to refer to remote wireless equipment that wirelessly accesses a BS.

The processor 402 can include one or more processors or other processing devices that control the overall operation of the BS 102 and/or the UE 104. For example, the processor 402 could control the reception of forward channel signals and the transmission of reverse channel signals by the transceiver 404 in accordance with well-known principles. The processor 402 could support additional functions as well, such as more advanced wireless communication functions. For instance, the processor 402 could support beam forming or directional routing operations in which outgoing/incoming signals from/to multiple antennas are weighted differently to effectively steer the outgoing signals in a desired direction. Any of a wide variety of other functions could be supported in the BS 102 or the UE 104 by the processor 402.

The processor 402 is also coupled to the Backhaul/Network IF 422. The Backhaul/Network IF 422 allows the BS 102 and/or the UE 104 to communicate with other devices or systems over a backhaul connection or a network. The Backhaul/Network IF 422 could support communications over any suitable wired or wireless connection(s). For example, when the BS 102 is implemented as part of a cellular communication system (such as one supporting 5G, LTE, or LTE-A), the Backhaul/Network IF 422 could allow the BS 102 to communicate with other Base Stations (BSs) over a wired or wireless backhaul connection. The Backhaul/Network IF 422 may include any suitable structure supporting communications over a wired or wireless connection, such as an Ethernet or an RF transceiver.

Various embodiments of the disclosure provide various methods for managing and overcoming the beam misalignment problem in the THz communication due to the change in the orientation and the mobility of the UEs. While various embodiments are discussed as being used in connection with THz communication systems, the disclosure is not limited thereto. For example, various embodiments of the disclosure may be implemented in any frequency range communication system including but not limited to, GHz, 5G, LTE, and $4^{th}$ generation (4G) communication systems.

Now, a flow chart of method operations will be described with reference to FIG. 5.

Figure 5:
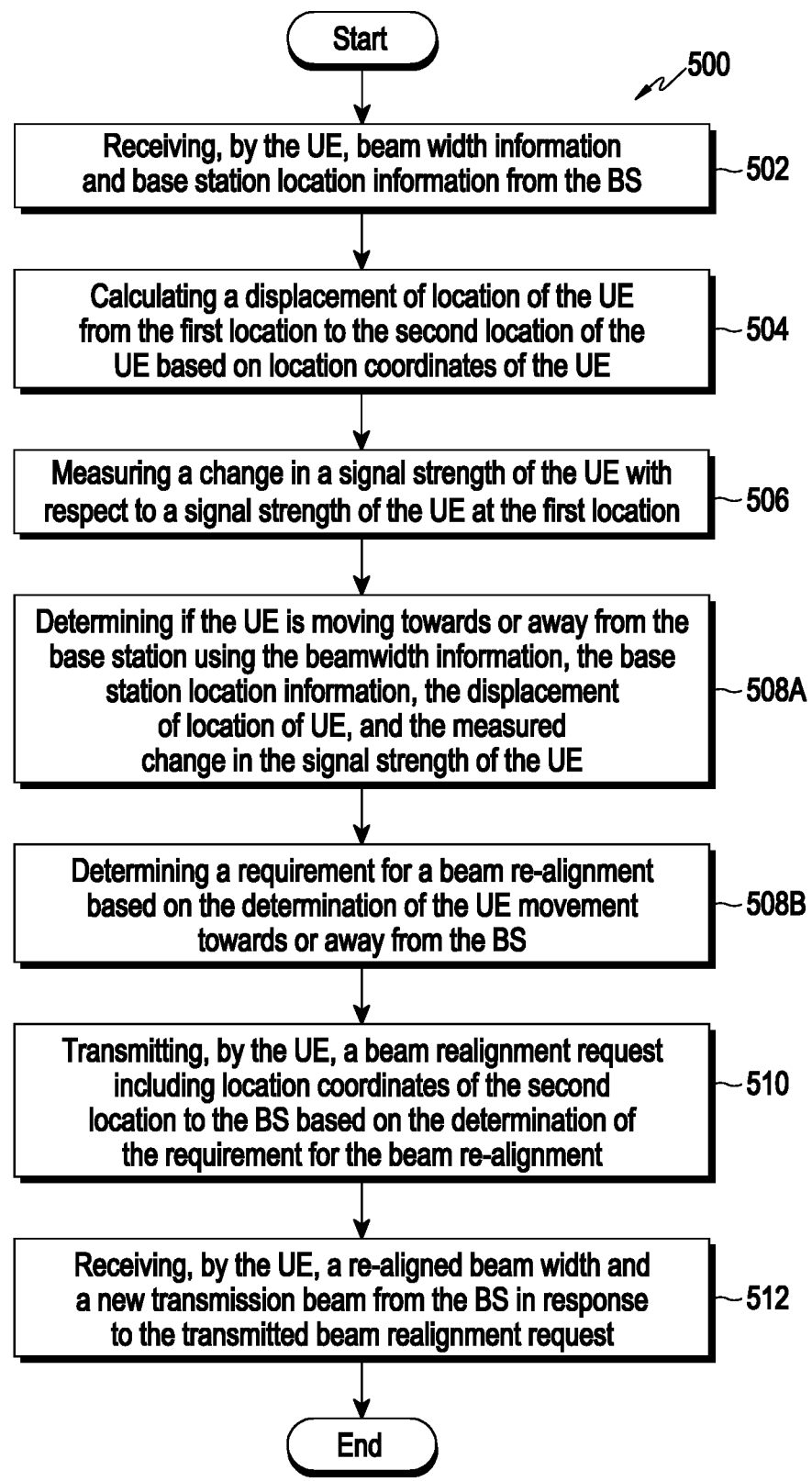
FIG. 5 is a flow chart of method operations for managing beam alignment in a high frequency wireless communication system by the UE 104, according to an embodiment of the disclosure.

FIG. 5 is a flow chart of method operations for managing beam alignment in a high frequency wireless communication system by the UE 104, according to an embodiment of the disclosure.

Referring to FIG. 5, the method 500 comprises at operation 502, receiving, by the UE 104, beam width information and base station location information from the BS 102. As an example, the receiver 404A of the transceiver 404 is configured to receive the beam width information and the base station location information from the BS 102 after initiation of an initial access process. The beam width information and the base station location information is received by the UE 104 from the BS 102 via a communication medium in the one of an Radio Resource Control (RRC) re-configuration message, a downlink control information (DCI) transmission over a physical channel in either one random-access response message or a contention resolution message, a dedicated DCI transmission over a physical channel, or a medium access control (MAC) control element (CE).

In particular, the BS 102 transmits the base station location information to the UE 104 using one of Master Information Block (MIB) transmission over Broadcast Channel (BCH) or Physical Broadcast Channel (PBCH), the RRC re-configuration message, the DCI transmission over the physical channel in either one of the random-access response or the contention resolution of Contention-based Random Access (CBRA) procedure, or the dedicated DCI transmission over the physical channel. Further, the BS 102 transmits the beam width information to the UE 104 based on one of the above-described methods using which the beam width information is received by the UE 104 from the BS 102. The beam width information includes information indicating a directivity angle (θ) of a transmission (Tx) beam transmitted by the BS 102. The beam width information may also include information associated with but is not limited to, a beam index, a reference signal type, a Quasi Co-Location (QCL) index, and beam widths in azimuth and elevation directions. More specifically, the BS 102 maintains a lookup table for all the beams with the following information including but not limited to, the beam index, the reference signal type, the QCL index, and the beam widths in the azimuth and elevation directions The flow of the method 500 now proceeds to at operation 504.

At operation 504, the method 500 further comprises calculating a displacement of location of the UE 104 from the first location to the second location of the UE 104 based on location coordinates of the UE 104. As an example, when the UE 104 moves from a first location to a second location with respect to a location of the BS 102, then the processor 402 calculates the displacement of the location of the UE 104. For the calculation of the displacement of the location of the UE 104, the processor 402 at first detects a movement of the UE 104 from an initial position towards another position with respect to the location of the BS 102. The initial position of the UE 104 is referred to as "a first location" without any deviation from the scope of the disclosure. The position after the movement of the UE 104 is referred to as "a second location" without any deviation from the scope of the disclosure. Thereafter, the processor 402 calculates the change in the displacement of the location of the UE 104 from the first location to the second location on location coordinates of the UE 104 corresponding to the respective first location and the second location with respect to the location coordinates of the BS 102 received as the base station location information. The flow of the method 500 now proceeds to at operation 506.

At operation 506, the method 500 comprises measuring a change in a signal strength of the UE 104 after the displacement of the location of the UE 104 with respect to a signal strength of the UE 104 at the first location. In particular, the processor 402 measures the change in the signal strength of the UE 104 by calculating a drop in the signal strength (RSRP or signal to interference and noise ratio (SINR)) when the UE moves from the first location (location 1 in FIG. 6D) to the second location (location 2 in FIG. 6D).

Further, for the calculation of the change in the displacement of the location of the UE 104, the UE 104 or the processor 402 also calculates a propagation distance (r), a beam range radius (d), and signal drop in different scenarios due to displacement of the UE 104.

Now an example illustrating the calculation of the beam range radius (d), different scenarios due to displacement of the UE 104, and a calculation of the change in the displacement of the location of the UE 104 i.e., displacement change (Δx) will be explained in accordance with FIGS. 6A to 6D, respectively in accordance with an embodiment of the disclosure.

Figure 6A:
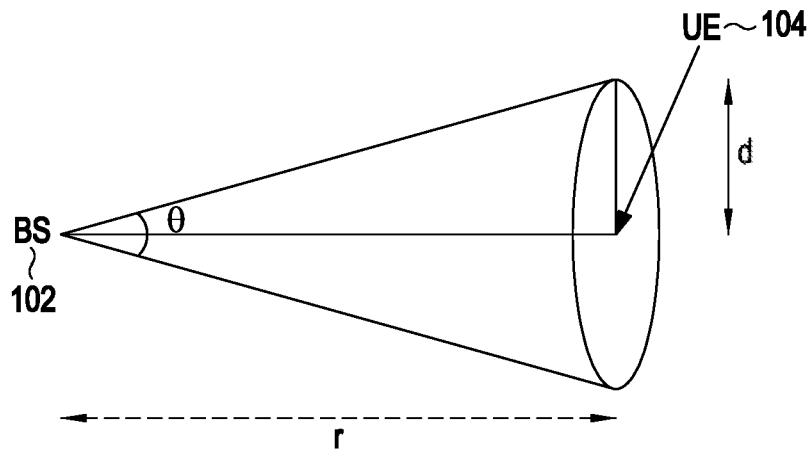
FIGS. 6A and 6B are diagrams illustrating an example of a base station Tx beam shape and a calculation of beam range radius, according to various embodiments of the disclosure.
Figure 6B:
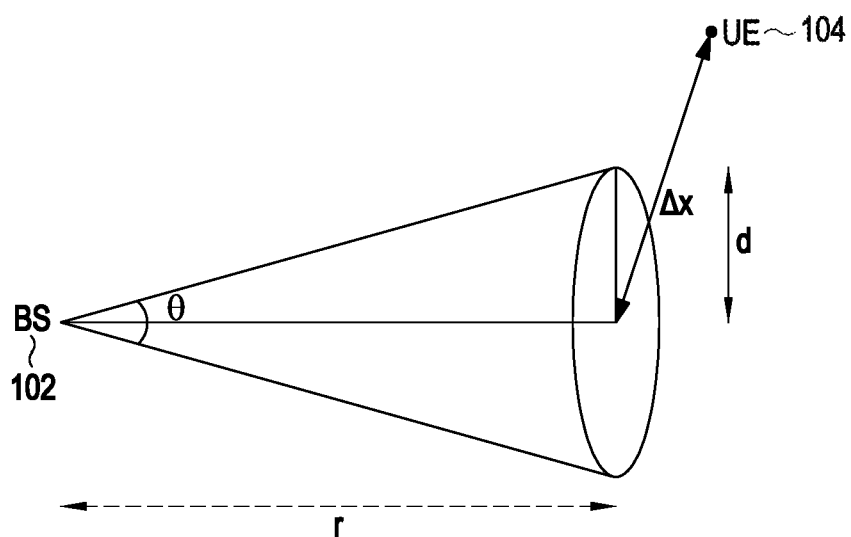

FIGS. 6A and 6B are diagrams illustrating an example of a base station Tx beam shape and the calculation of beam range radius, according to various embodiments of the disclosure.

Referring to FIGS. 6A and 6B, according to an embodiment of the disclosure, the processor 402, for the calculation of the change in the displacement of the location of the UE 104, at first, calculates a beam range radius (d) using the location coordinates of the BS 102 and the beam-width (directivity angle (θ)) of the Tx beam (as shown in FIGS. 6A and 6B) that is included in the received beam width information. The Beam range radius is a distance by which if the UE 104 moves, then it will fall out of BS's Tx beam range.

Thereafter, the processor 402 calculates a propagation distance (r) between the UE 104 and the BS 102 either using measured signal strength (reference signal received power (RSRP))) values or the location coordinates of the BS 102. Assuming that the UE 104 has information about the BS's Tx beam width (θ) and BS's location coordinates by means of the beam width information and the base station location information that are received by the UE 104 from the BS 102 after the initiation of the initial access process. The BS 102 informs the Tx beam width to the UE 104 whenever it changes the beam width through the fall-back connection. For example, using the location coordinates of the BS 102 and the location coordinates of the UE 104, the UE can calculate "r" as given below in Equation 1:

$$r = \sqrt{(x-x_g)^2 + (y-y_g)^2 + (z-z_g)^2} \quad \text{Equation 1}$$

Here, (x, y, z) are the latest coordinates of the UE 104 and ($x_g$, $y_g$, $z_g$) are coordinates of the BS 102, respectively. Further, using the propagation distance "r", the UE 104 or the processor 402 calculates the beam range radius using Equation 2 and the displacement change (Δx) using the Equation 3, respectively, as given below:

$$d = d = r \times \tan[(\theta/2)] \quad \text{Equation 2}$$

$$\Delta x = \sqrt{(x-x_r)^2 + (y-y_r)^2 + (z-z_r)^2} \quad \text{Equation 3}$$

Here, the Δx corresponds to a relative displacement of the UE 104 with respect to its last informed coordinates to the BS 102, (x, y, z) are the latest coordinates of the UE 104, and ($x_r$, $y_r$, $z_r$) are the last informed UE coordinates to the BS 102.

Figure 6C:
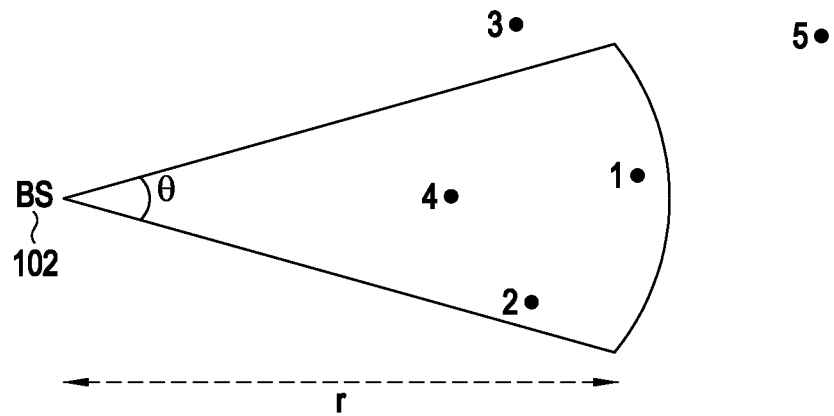
FIG. 6C is a diagram illustrating example scenarios of UE mobility due to the UE displacement of the UE, according to an embodiment of the disclosure
Figure 6D:
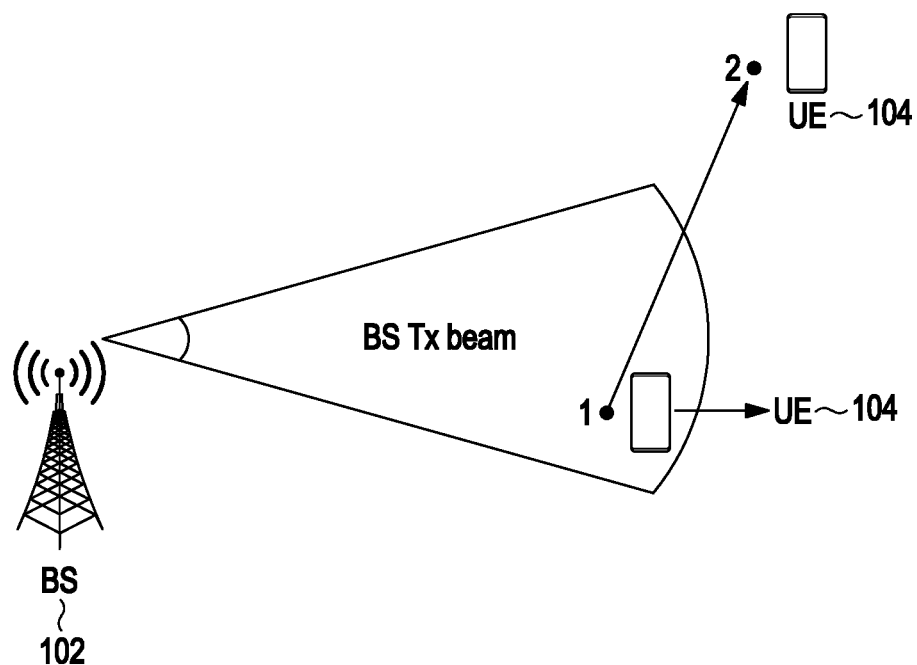
FIG. 6D is a diagram illustrating UE motion with respect to a fixed B's Tx beam, according to an embodiment of the disclosure.

Referring to FIGS. 6A, 6B, and 6D, the calculation of the beam range radius d is performed by taking a conical beam shape Similar calculations can be done to find the beam range radius threshold "d" for other beam shapes as well.

The flow of the method 500 now proceeds to at operation 508A. At operation 508A, the method 500 comprises determining if the UE 104 is moving towards or away from the BS 102 using the beam width information, the base station location information, the displacement of location of UE 104, and the measured change in the signal strength of the UE 104.

The flow of the method 500 now proceeds to at operation 508B. At operation 508B, the method 500 comprises determining a requirement for a beam re-alignment based on the based on the determination of the UE movement towards or away from the BS 102. In particular, the processor 402 determines whether the UE 104 is moving towards or away from the BS 102 and on the basis of this determination it further determines whether there is a requirement for the beam re-alignment. For performing these determination operations, the processor 402 performs a comparison of the calculated displacement change (Δx) with the calculated beam range radius (d) and a comparison of the measured change in the signal strength ((Δ_RSRP or Δ_SINR) of the UE 104 with a predefined threshold value i.e., ΔΓ_RSRP or ΔΓ_SINR. In a case where a result of the comparison of the calculated the displacement change (Δx) with the calculated beam range radius (d) indicates that the calculated displacement of the location of the UE is greater than the calculated beam range radius (d), and in a case if a result of the comparison of Δ_RSRP or Δ_SINR with the ΔΓ_RSRP or ΔΓ_SINR indicates that the Δ_RSRP or Δ_SINR exceeds the ΔΓ_RSRP or ΔΓ_SINR, then in such case the processor 402 determines that the UE 104 is moving away from a direction of beam range of the BS's Tx beam, and there is a requirement of the transmission of the beam realignment request. The process of determining whether the UE 104 is moving away from the direction of the beam range of the BS's Tx beam can be performed in two ways in a non-standalone scenario.

Hence, the first way is RSRP-based determination. In this case, if $RSRP_{N-1}$ is the observed RSRP at measurement time slot N−1 and $RSRP_N$ is the observed RSRP at measurement time slot N, then the UE 104 determines that it is or going out of range of BS's Tx beam range if there is a sudden drop in RSRP by 10-15 dB ($\Delta_{RSRP}$), i.e. $RSRP|_{N-1} - RSRP|_N > \Delta_{RSRP}$, $\Delta_{RSRP}$: 10~15 dB. Thus, the UE 104 identifies and informs change in direction of departure (DoD) to the BS 102.

The second way is SINR-based determination. In this case, if $SINR_{N-1}$ is the observed SINR at measurement time slot N−1 and $SINR_N$ is the observed SINR at measurement time slot N, then UE 104 will determine it is or going out of range of BS's Tx beam range if there is a sudden drop in SINR by 5-10 dB, i.e. $SINR|_{N-1} - SINR|_N > \Delta_{SINR}$, $\Delta_{SINR}$: 5~10 dB. The value of $\Delta_{RSRP}$ and $\Delta_{SINR}$ can be pre-configured in the UE 104 based on simulation evaluations/field trials or it can be measured by the UE 104 based on statistics.

Further, in a standalone scenario, the UE 104 identifies and informs change in direction of departure (DoD) to the BS 102. In the standalone scenario, there is no fall-back connection, so the UE 104 must identify the need for the beam realignment much earlier than the actual beam misalignment between BS's Tx beam and UE's Rx beam, or else link failure will happen. Thus, UE 104 shall identify the cases where the UE moves near the edge of the beam range.

For identifying the need for beam realignment, the UE 104 follows the below-mentioned procedure in the standalone scenario. The first procedure is RSRP-based. If $RSRP_n$ is less than $RSRP_{n-1}$ for k continuous number measurement time slots, i.e. $RSRP|_{n+i} < RSRP|_{n-1+i}$ for i=1 to k, then it is determined by the processor 402 that the UE 104 is going out of the range of BS's Tx beam range and thereby identifies and informs change in DoD to the BS 102. The second procedure is SINR-based. In this procedure, if $SINR_N$ is less than $SINR_{N-1}$ for k continuous number measurement time slots, i.e. $SINR|_{n+i} < SINR|_{n-1+i}$ for i=1 to k, then the processor 402 determines that the UE 104 is going out of the range of BS's Tx beam range. The value of K can be pre-configured in the UE 104 based on simulation evaluations/field trials or it can be measured by the UE 104 based on statistics.

Once it is determined by the UE 104 that it is moving away from the direction of the beam range of the BS's Tx beam, then the processor 402 at operation 510 of method 500 transmits the beam realignment request including the location coordinates of the second location to the BS 102 based on the determination of the requirement for the beam re-alignment. The beam realignment request is transmitted by the UE 104 to the BS 102 via the fall-back connection using one of a Physical Uplink Control Channel (PUCCH) format or a Physical Uplink Shared Channel (PUSCH) format as part of the THz link feedback. In particular, in each of the standalone scenario and the non-standalone scenario, the beam realignment request including the location coordinates of the second location (UE's latest coordinates (x, y, z)) is transmitted to the BS 102 based on the determination that the UE 104 is moving away from the beam range of the BS's Tx beam. The beam realignment request from the UE 104 can be sent to the BS 102 through the fall-back connection whether it is LTE or 5G NR in the non-stand-alone case or through a stand-alone link. The beam realignment request indicates a request for transmission of a re-aligned beam width from the BS 102. When it is determined that the UE 104 is moving away from the beam range of the BS's Tx beam then in that case the beam realignment request indicates a request for a wider beam than an earlier requested beam.

According to an embodiment of the disclosure, in the case if the result of the comparison of the calculated the displacement change ($\Delta x$) with the calculated beam range radius (d) indicates that the calculated displacement of the location of the UE is greater than the calculated beam range radius (d), and if a result of the comparison of $\Delta\_RSRP$ or $\Delta\_SINR$ with the $\Delta\Gamma\_RSRP$ or $\Delta\Gamma\_SINR$ indicates that the $\Delta\_RSRP$ or $\Delta\_SINR$ is less than the $\Delta\Gamma\_RSRP$ or $\Delta\Gamma\_SINR$. Then in such case, the processor 402 determines that the UE is moving towards the direction of the beam range of the Tx beam and further transmits the beam realignment request including the location coordinates of the second location to the BS 102 based on the determination that the UE 104 is moving towards the direction of the beam range of the BS's Tx beam. When it is determined that the UE 104 moving towards the direction of the beam range of the BS's Tx beam then in that case the beam realignment request indicates a request for a narrower beam than an earlier requested beam.

Now different example scenarios of UE mobility due to the displacement of the UE 104 will be described with reference to FIG. 6C. FIG. 6C is a diagram illustrating different example scenarios of the UE mobility due to the UE displacement, according to an embodiment of the disclosure.

Referring to FIG. 6C, initially, the UE's position is assumed at location 1, and locations 2,3,4, and 5 are taken as the next locations after the mobility. Whenever the UE 104 reaches locations 2/3/4/5 from location 1, it shall identify the need for re-alignment assuming its current and future location and request the BS 102 for the beam re-alignment.

Location 1 corresponds to the initial location of the UE 104. Location 2 corresponds to a location after the displacement of the UE 104 from location 1. At this location, the displacement change ($\Delta x$)>d and the $\Delta_{RSRP}$>$\Delta\Gamma_{RSRP}$, as this location is at Tx beam sector edge. Hence, the UE 104 shall request for the beam re-alignment from the BS 102 when it reaches the edge of the beam range like location 2. This is because the UE 104 might move out of the range beyond that location.

Location 3 corresponds to a location that is outside of the Tx beam sector at which the displacement change ($\Delta x$)>d and the $\Delta_{RSRP}$>$\Delta\Gamma_{RSRP}$. The UE 104 may request for the beam re-alignment to the BS 102 using a fall-back link when it moves out of range like locations 3 and 5.

Location 4 corresponds to a location after the displacement of the UE 104 from location 1. At the location 4, the displacement change ($\Delta x$)>d and the $\Delta_{RSRP}$<$\Delta\Gamma_{RSRP}$ as this location is inside the Tx beam sector and closer to the BS 102. In this case, the UE 104 has moved a significant distance but still falls under the beam coverage. Thus, the UE 104 may transmit the realignment request to the BS 102, so that the BS 102 can align with a wider beam width as the UE 104 has moved closer to the BS 102.

Location 5 corresponds to a location after the displacement of the UE 104 from location 1. At this location, the displacement change ($\Delta x$)>d and the $\Delta_{RSRP}$>$\Delta\Gamma_{RSRP}$ as this location path loss is very high compared to location 1 of the UE 104, therefore the BS 102 needs to change the Tx beam width. Hence, the UE 104 may also transmit the beam realignment request to the BS 102.

The flow of the method 500 now proceeds to at operation 512. At operation 512, subsequent to the transmission of the beam realignment request to the BS 102 by the UE 104, the method 700 comprises receiving, by the UE 104, a re-aligned beam width and a new transmission beam from the BS 102 in response to the transmitted beam realignment request. In particular, the UE 104 receives, via the receiver 404A of the transceiver 404, receives the re-aligned beam width and the new transmission beam from the BS 102 in response to the transmitted beam realignment request. The re-aligned beam width and the new transmission beam are received by the UE 104 from the BS 102 via at least one of a message having a Physical Downlink Control Channel (PDCCH) Downlink Control Information (DCI) format, a message including the MAC CE, the RRC Reconfiguration message, or through a combination of the RRC Reconfiguration message, the message including the MAC CE, and PDCCH messages. In particular, Further, the BS 102 transmits the generated new transmission beam with the optimal transmission width to the UE 104 in response to the received beam realignment request based on one of the above-described methods using which the re-aligned beam width and the new transmission beam are received by the UE 104 from the BS 102.

Figure 7:
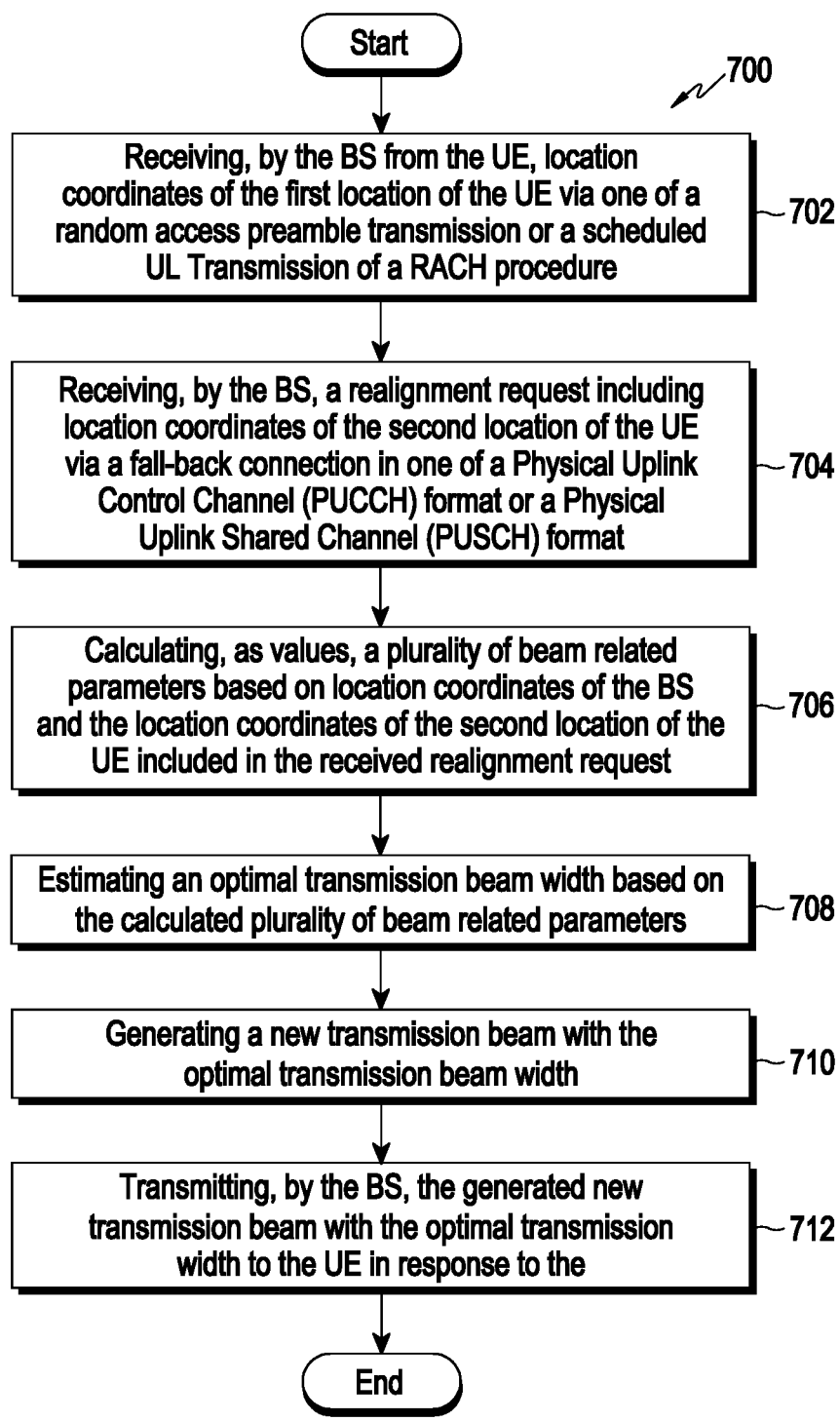
FIG. 7 is a flow chart of method operations for managing beam alignment in the high frequency wireless communication system by the BS 102, according to an embodiment of the disclosure.

Referring to FIG. 7, FIG. 7 is a flow chart of method operations for managing beam alignment in the high frequency wireless communication system by the BS 102, according to an embodiment of the disclosure.

The method 700 comprises at operation 702, receiving, by the BS 102 from the UE 104, location coordinates of the first location of the UE. In particular, the BS 102 receives the location coordinates of the first location of the UE 104 during the initiation of the access process via one of a random access preamble transmission, a scheduled UL Transmission of a RACH procedure, or a scheduled UL transmission using Physical Uplink Shared Channel (PUSCH) or through Physical Uplink Control Channel (PUCCH). The flow of the method 700 now proceeds to at operation 704.

At operation 704, the method 700 comprises receiving, by the BS 102, the beam realignment request including location coordinates of the second location of the UE 104 that is transmitted by the UE 104 at operation 510 of the method 700. The BS 102 receives the beam realignment request from the UE 104 via the fall-back connection in one of the PUCCH format or the PUSCH format. The beam realignment request includes a flag or 1 bit for beam realignment, and pre-defined number of bits indicating location coordinates of the second location of the UE 104. The flow of the method 700 now proceeds to at operation 706.

At operation 706, the method 700 comprises calculating, as values, a plurality of beam related parameters based on the location coordinates of the base station and the location coordinates of the second location of the UE 104 included in the received realignment request. In particular, once the beam re-alignment request is received, the processor 402 of the BS 102 calculates a direction of departure (DoD), a propagation distance (r) between the UE 104 and the BS 102, a moving speed of the UE 104, and other desired parameters as the plurality of beam related parameters using the location coordinates of the BS 102 and the location coordinates of the UE 104.

For calculating the DoD, the processor 402 uses the location coordinates of the BS 102 and the latest location coordinates (x, y, z) of the UE 104. Also, for calculating the Propagation distance (r) the processor 402 uses the location coordinates of the BS 102 and the latest location coordinates (x, y, z) of the UE 104. The Propagation distance (r) is calculated using the Equation 4 as below:

$$r=\sqrt{(x-x_g)^2+(y-y_g)^2+(z-z_g)^2} \quad \text{Equation 4}$$

Here, (x, y, z) are the latest location coordinates of the UE 104 as received in the beam realignment request, and the ($x_g$, $y_g$, $z_g$) are the location coordinates of the BS 102.

For calculating the moving speed/velocity of the UE 104, the processor 402 uses the latest reported coordinates and previously reported coordinates of the UE 104.

The processor 402 also calculates optimal Tx beam width (θ) and Tx beam angles (Azimuth, elevation) using the location coordinates of the BS 102 and the location coordinates of the UE 104. The flow of the method 700 now proceeds to at operation 708.

At operation 708, the method 700 comprises estimating an optimal transmission beam width based on the calculated plurality of beam related parameters. In particular, the processor 402 estimates an optimal Tx beam (θ) width based on the calculated values of the propagation distance (r) and the moving speed of the UE 104 which will be used by the UE 104 and the BS 102 for further communication. The processor 402 may also identify the direction of transmission of the optimal Tx beam (θ) width using the latest location coordinates of the BS 102 and the latest reported coordinates of the UE 104. The flow of the method 700 now proceeds to at operation 710.

At operation 710, the method 700 comprises generating a new transmission beam with an optimal Tx beam (θ) width that is estimated by the processor at operation 708. In particular, the BS 102 forms a Tx beam with a beam width equal to the estimated optimal beam width (θ), in the direction of calculated beam angles. If the BS 102 can form Tx beams with a finite number of beam width values in a finite number of directions, then the BS 102 will choose a Tx beam that best matches the estimated optimal beam width (θ) and the calculated beam angles.

According to an embodiment of the disclosure, the processor 402 may also generate the new transmission beam with the estimated optimal transmission beam width (θ), based on the DoD that is calculated as one of a parameter among the beam related parameters.

According to an embodiment of the disclosure, the processor 402 may also compare comparing the calculated propagation distance with a predefined propagation threshold value to determine whether the calculated propagation distance exceeds the predefined propagation threshold value, and thereafter may generate the new transmission beam with a narrow beam width when it is determined that the propagation distance exceeds the predefined propagation threshold value based on a result of the comparison. As an example, if the calculated propagation distance is large then the BS 102 may use narrow Tx beams which have high gain to mitigate high path loss for the THz communication. Further, if the calculated propagation distance is less than the propagation threshold value then the BS 102 may use a wider beam for the UE 104 with a shorter propagation distance.

The flow of the method 700 now proceeds to at operation 712. At operation 712, subsequent to the generation of the new transmission beam with the optimal Tx beam (θ) width, the method 700 comprises transmitting, by the BS 102, the generated new transmission beam with the optimal transmission beam width to the UE 104 in response to the received beam realignment request. In particular, using the transmitter 404B of the transceiver 404, the BS 102 informs the UE 104 about the new beam width θ through the fall-back connection in the non-standalone scenario or through the THz link in the standalone scenario. The new beam width θ can be informed to the UE 104 by including it in message information that can be sent either in a new PDCCH DCI format or as an additional parameter in one of the existing PDCCH DCI format using its downlink control channel. The BS 102 may also indicate the configuration of the new beam width in azimuth and elevation directions, reference signal type, and QCL type through a beam index using the PDCCH or through the MAC CE.

Further, when the generated new transmission beam with the optimal transmission beam width is received at the UE 104 side in response to the received beam realignment request, then the processor 402 of the UE 104, computes the direction of arrival (DoA) of the received new transmission beam based on the latest location coordinates of the UE 104 (location coordinates of the current location) and the received base station location information. According to an embodiment of the disclosure, the processor 402 of the UE 104 may also calculate the plurality of beam angles (azimuth and elevation angles) corresponding to the received new transmission beam based on the computed DoA and a change in orientation of the UE 104. Thereafter, the processor 402 of the UE 104 generates a receiver beam in a direction of the computed DoA and a direction of the calculated DoA for each of the azimuth and elevation angles.

Now an example description will be made for explaining the method operations of FIG. 5 in detail using FIG. 8.

Figure 8:
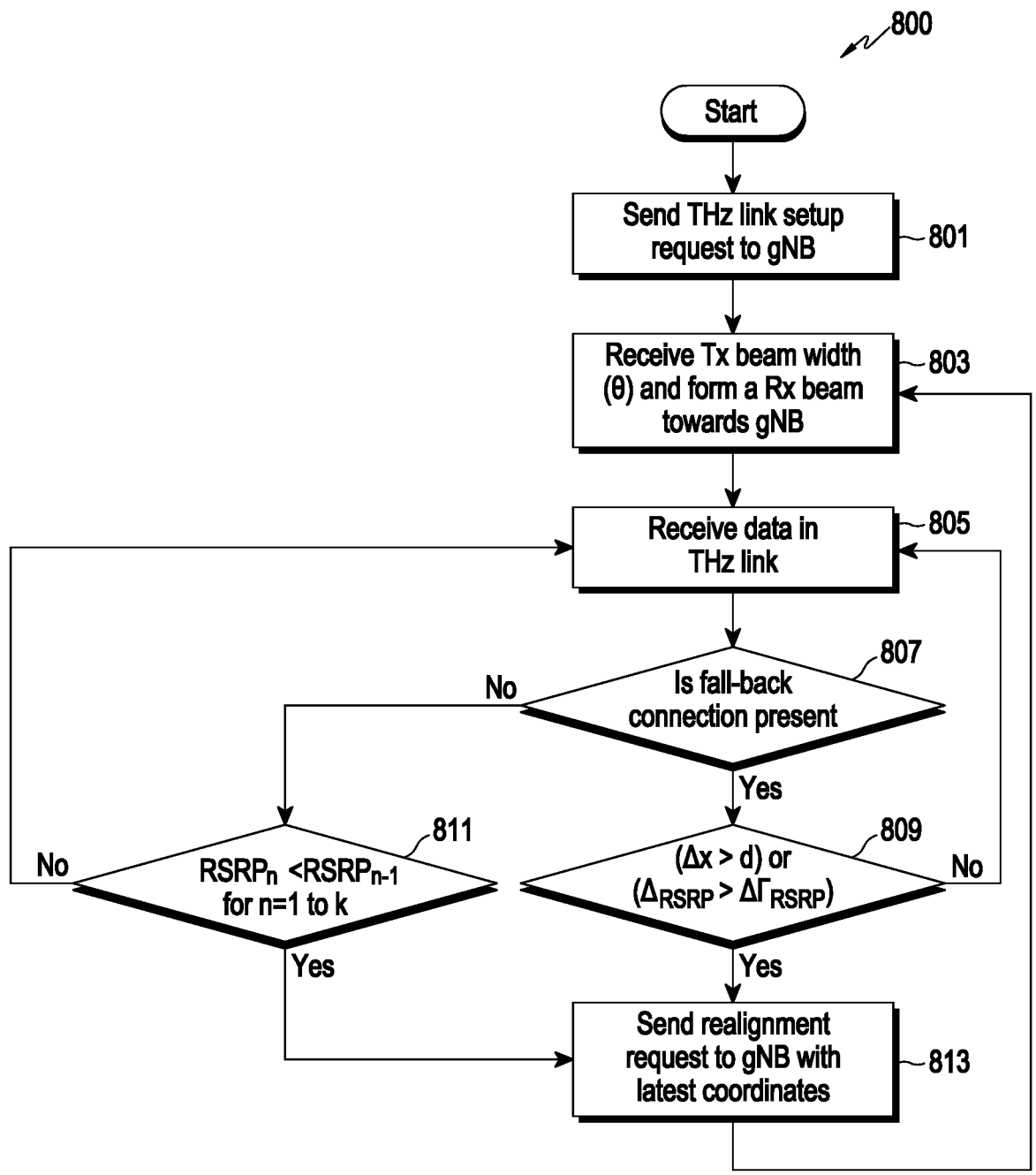
FIG. 8 is a detailed flow diagram representing the method operations for managing the Tx-Rx beam re-alignment by the UE 104, according to an embodiment of the disclosure.

FIG. 8 is a diagram is a detailed flow diagram representing the method operations for Tx-Rx beam re-alignment at the UE 104 side according to an embodiment of the disclosure.

Referring to FIG. 8, it depicts a method 800 for managing the Tx-Rx beam re-alignment by the UE 104 and includes a series of operations 801 through 813.

The functionalities and the operation which are similar to that of the operations of the method 500 as described above are omitted herein for the sake of simplicity and brevity.

At operation 801, the UE 104 sends the THz link setup request to the BS 102 (referred to as gNB in FIG. 8).

At operation 803, the UE 104 receives the Tx beam width and forms an Rx beam towards the gNB (BS 102)

At operation 805, the UE 104 receives data in the THz link.

At operation 807, the UE 104 determines whether the fallback connection to connect with the BS 102 is present or not. If not, then the UE 104 at operation 811, determines whether the value of RSRP_n is less than RSRP_(n−1) for k continuous number measurement time slots. If the result of the determination is yes, then at operation 813, the UE 104 sends a realignment request to the gNB with the latest location coordinates.

If the UE at operation 807 determines that the fall-back connection is present then the UE 104 determines (at operation 809) whether Δx is greater than the calculated beam range radius (d), and whether the measured signal strength difference (Δ_RSRP or Δ_SINR) is greater than a threshold (ΔΓ_RSRP or ΔΓ_SINR). If the result of the determination at operation 809 is no, then the UE 104 goes back to operation 805 and performs the rest of the operations again. However, if the result of the determination at operation 809 is yes, then the UE 104 sends the beam realignment request to the BS 102 (gNB) with the latest location coordinates of the UE 104.

Now an example description will be made for explaining the method operations of FIG. 7 in detail using FIG. 9.

Figure 9:
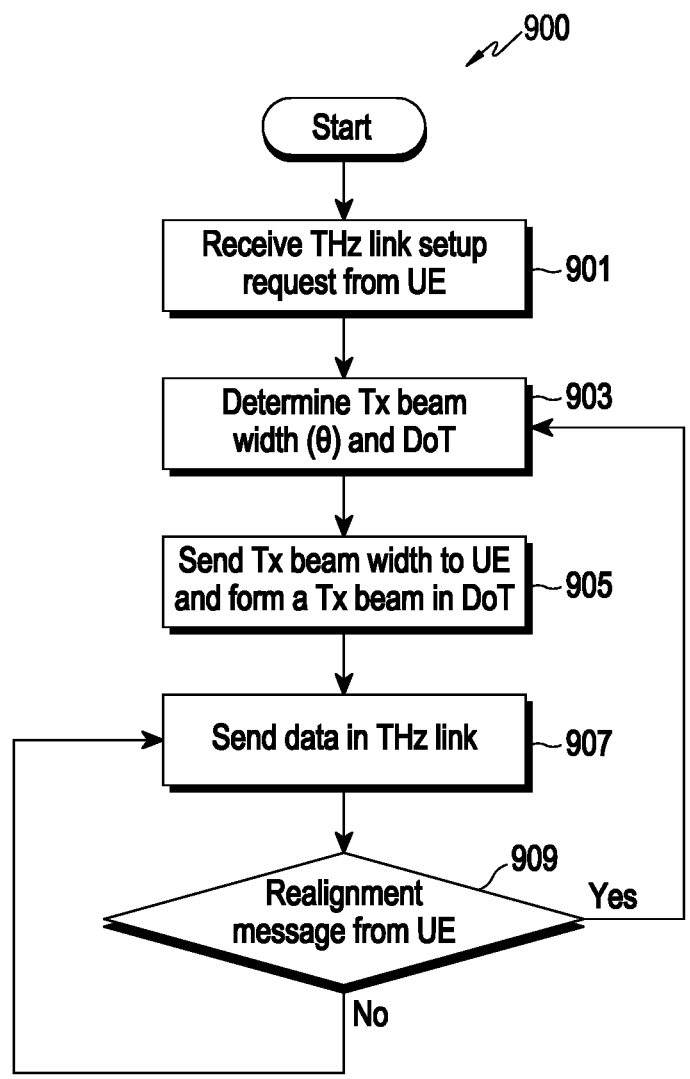
FIG. 9 is a detailed flow diagram representing the method operations for managing the Tx-Rx beam re-alignment by the BS 102, according to an embodiment of the disclosure.

FIG. 9 is a detailed flow diagram representing the method operations for managing the Tx-Rx beam re-alignment by the BS 102, according to an embodiment of the disclosure.

Referring to FIG. 9 depicts a method 900 for managing the Tx-Rx beam re-alignment by the BS 102 and includes a series of operations 901 through 909.

At operation 901, the BS 102 receives a THz link setup request from the UE 104 via the fall-back connection using one of the PUCCH format or the PUSCH format as a part of the THz link feedback.

At operation 903, the BS 102 calculates optimal Tx beam width (θ) and direction of transmission (DoT) in accordance with operations 706 and 708 of the method 700.

At operation 905, the BS 102 sends the calculated Tx beam width (θ) to the UE 104 and forms/generates a new Tx beam in the DoT in accordance with the operation 710 of the method 700.

At operation 907, the BS 102 sends data including the formed/generated new Tx beam in THz links to the UE 104.

At operation 909, the processor 402 of the BS 102 determines whether a beam realignment message including a new beam realignment request is received from the UE 104. If the result of the determination of operation 9 is yes, then the BS 102 repeats the process of the method operation from 903 to 909. Further, if the result of the determination of operation 9 is No, then the BS 102 will perform operation 907 of the method 900.

According to the method and system of the disclosure, UEs and BSs can handle the frequent beam mis-alignments at higher bands in a much faster way with improved efficiency to provide the user a smooth beam handover.

Further, the method and system of the disclosure help in the mitigation of the problems discussed in the background section regarding the beam misalignment for THz line of sight communication and accordingly provides an efficient way of the beam alignment procedure that provides faster beam re-alignment of the Tx and Rx beams.

The method and system of the disclosure applies to all the network elements including the BSs and UEs in next-generation cellular systems to be deployed at higher bands.

In a hardware configuration, the method and the communication system according to the embodiments of the disclosure may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method and the communication according to the embodiments of the disclosure may be implemented in the form of modules, procedures, functions, etc. performing the above-described functions or operations. Instructions may be stored in a memory unit and executed by a processor. The memory unit may be located at the interior or exterior of the processor and may transmit and receive data to and from the processor via various known means.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Those skilled in the art will appreciate that the operations described herein in the disclosure may be carried out in other specific ways than those set forth herein without departing from essential characteristics of the disclosure. The above-described embodiments are therefore to be construed in all aspects as illustrative and not restrictive. The scope of the disclosure should be determined by the appended claims, not by the above description, and all changes coming within the meaning of the appended claims are intended to be embraced therein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing beam alignment in a wireless communication system by a User Equipment (UE), the method comprising:

receiving beam width information and base station location information from a base station;

calculating a displacement of location of the UE from a first location to a second location of the UE based on location coordinates of the UE;

measuring a change in a signal strength of the UE after the displacement of the location of the UE with respect to a signal strength of the UE at the first location;

determining whether movement of the UE is towards or away from the base station using at least one of the beam width information, the base station location information, the displacement of location of the UE, and the measured change in the signal strength of the UE;

determining whether a beam re-alignment is required based on the determining whether the movement of the UE is towards or away from the base station;

transmitting a beam realignment request including location coordinates of the second location of the UE to the base station based on determining that the beam re-alignment is required; and receiving a re-aligned beam width and a new transmission beam from the base station in response to the transmitted beam realignment request.

2. The method of claim 1,
wherein the beam width information includes information indicating a directivity angle of a transmission beam transmitted by the base station, and
wherein the method further comprises calculating a beam range radius of the transmission beam based on the directivity angle of the transmission beam, the received beam width information, the base station location information, and the location coordinates of the UE.

3. The method of claim 2, wherein the beam width information further includes information associated with a beam index, a reference signal type, a Quasi Co-Location (QCL) index, and beam widths in azimuth and elevation directions.

4. The method of claim 2, further comprising:
performing a first comparison comparing the calculated displacement of the location of the UE with the calculated beam range radius to determine whether the calculated displacement of the location of the UE exceeds the calculated beam range radius;
performing a second comparison comparing the measured change in the signal strength with a predefined threshold value to determine whether the measured change in the signal strength of the UE exceeds the predefined threshold value; and
determining that the UE is moving away from a direction of the beam range of the transmission beam in a case where the first comparison indicates that the calculated displacement of the location of the UE is greater than the calculated beam range radius, and the second comparison indicates that the measured change in the signal strength of the UE exceeds the predefined threshold value,
wherein the determination of the movement of the UE being away from the base station is based on the determination that the UE is moving away from the beam range of the transmission beam.

5. The method of claim 4, further comprising:
determining that the UE is moving towards the direction of the beam range of the transmission beam in a case where the first comparison indicates that the calculated displacement of the location of the UE is greater than the calculated beam range radius, and the second comparison indicates that the measured change in the signal strength of the UE is less than the predefined threshold value; and
wherein the determination of the movement of the UE being towards the base station is based on the determination that the UE is moving towards the direction of the beam range of the transmission beam.

6. The method of claim 5, the re-aligned beam width corresponds to a wide beam width in a case where the beam realignment request is transmitted to the base station based on the determination that the UE is moving towards the direction of the beam range of the transmission beam.

7. The method of claim 4, wherein the re-aligned beam width corresponds to a narrow beam width in a case where the beam realignment request is transmitted to the base station based on the determination that the UE is moving away from the beam range of the transmission beam.

8. The method of claim 1, wherein each of the beam width information and the base station location information is received by the UE from the base station via one of a Radio Resource Control (RRC) re-configuration message, a downlink control information (DCI) transmission over a physical channel in either one of random-access response message or a contention resolution message, a dedicated DCI transmission over a physical channel, or a medium access control (MAC) control element (CE).

9. The method of claim 1, wherein the beam realignment request is transmitted by the UE to the base station via a fall-back connection using one of a Physical Uplink Control Channel (PUCCH) format or a Physical Uplink Shared Channel (PUSCH) format.

10. The method of claim 1, wherein the re-aligned beam width and the new transmission beam are received by the UE from the base station via at least one of a message having a Physical Downlink Control Channel (PDCCH) Downlink Control Information (DCI) format, a message including Medium access control (MAC) control element (CE), a RRC Reconfiguration message, or through a combination of the RRC Reconfiguration message, the message including the MAC CE, and PDCCH messages.

11. The method of claim 1, wherein the beam realignment request indicates a request for transmission of the re-aligned beam width from the base station.

12. The method of claim 1, further comprising:
computing a direction of arrival (DoA) of the received new transmission beam based on the location coordinates of the UE corresponding to the second location and the received base station location information;
calculating a plurality of beam angles corresponding to the received new transmission beam based on the computed DoA and a change in orientation of the UE; and
generating a receiver beam in a direction of each of the calculated plurality of beam angles.

13. A method for managing beam alignment in a wireless communication system by a base station, the method comprising:
receiving, from a User Equipment (UE), location coordinates of a first location of the UE;
receiving a beam realignment request including location coordinates of a second location of the UE;
calculating a plurality of beam related parameters based on location coordinates of the base station and the location coordinates of the second location of the UE included in the received beam realignment request;
estimating an optimal transmission beam width based on the calculated plurality of beam related parameters;
generating a new transmission beam with the optimal transmission beam width; and
transmitting the generated new transmission beam with the optimal transmission beam width to the UE in response to the received beam realignment request.

14. The method of claim 13, wherein the calculated plurality of beam related parameters includes a direction of departure, a propagation distance between the UE and the base station, and a moving speed of the UE.

15. The method of claim 14, further comprising generating the new transmission beam with the optimal transmission beam width based on the direction of departure that is calculated as a parameter among the plurality of beam related parameters.

16. The method of claim 14, further comprising:
comparing the propagation distance with a predefined propagation threshold value to determine whether the propagation distance exceeds the predefined propagation threshold value; and
generating the new transmission beam with a narrow beam width when it is determined that the propagation distance exceeds the predefined propagation threshold value based on a result of the comparison.

17. The method of claim 13, further comprising:
transmitting, by the base station, base station location information to the UE based on one of Master Information Block (MIB) transmission over Broadcast Channel (BCH) or Physical Broadcast Channel (PBCH), an RRC re-configuration message transmission, a downlink control information (DCI) transmission over a physical channel in either one of random access response or a contention resolution of Contention-based Random Access (CBRA) procedure, or a dedicated DCI transmission over the physical channel.

18. The method of claim 17, further comprising:
transmitting, by the base station, beam width information to the UE based on one of an RRC re-configuration message transmission, a Medium access control (MAC) control element (CE), a downlink control information (DCI) transmission over a physical channel in either one of random-access response message or a contention resolution message, a dedicated DCI transmission over the physical channel, or a combination of the RRC Reconfiguration, the MAC CE, and the PDCCH messages.

19. A user equipment (UE) for managing beam alignment in a communication system, the UE comprising:
a transceiver; and
at least one processor coupled to the transceiver,
wherein the at least one processor is configured to:
receive beam width information and base station location information from a base station,
calculate a displacement of location of the UE from a first location to a second location of the UE based on location coordinates of the UE,
measure a change in a signal strength of the UE after the displacement of the location of the UE with respect to a signal strength of the UE at the first location,
determine whether movement of the UE is towards or away from the base station using at least one of the beam width information, the base station location information, the displacement of location of the UE, and the measured change in the signal strength of the UE,
determine whether a beam re-alignment is required based on determining whether the movement of the UE is towards or away from the base station,
transmit a beam realignment request including location coordinates of the second location of the UE to the base station based on determining that the beam re-alignment is required, and
receive a re-aligned beam width and a new transmission beam from the base station in response to the transmitted beam realignment request.

20. A base station for managing beam alignment in a wireless communication system, the base station comprising:
a transceiver; and
at least one processor coupled to the transceiver,
wherein the at least one processor is configured to:
receive, from a User Equipment (UE), location coordinates of a first location of the UE,
receive a beam realignment request location coordinates of a second location of the UE,
calculate a plurality of beam related parameters based on location coordinates of the base station and the location coordinates of the second location of the UE included in the received beam realignment request,
estimate an optimal transmission beam width based on the calculated plurality of beam related parameters,
generate a new transmission beam with the optimal transmission beam width, and
transmit the generated new transmission beam with the optimal transmission beam width to the UE in response to the received beam realignment request.

\* \* \* \* \*